United States Patent [19]

Salgado

[11] Patent Number: 5,579,447
[45] Date of Patent: Nov. 26, 1996

[54] SYSTEM FOR DEVELOPING AND DISPLAYING A REPRESENTATION OF A TOTAL ESTIMATED TIME TO PRINT A JOB

[75] Inventor: David L. Salgado, Victor, N.Y.

[73] Assignee: Xerox Corporation, Stamford, Conn.

[21] Appl. No.: 344,915

[22] Filed: Nov. 25, 1994

[51] Int. Cl.$^6$ ................................................ G06K 15/00
[52] U.S. Cl. .................................... 395/109; 395/114
[58] Field of Search ................................. 358/434, 401, 358/442, 449, 468, 296; 355/208, 209, 203; 395/109, 114

[56] References Cited

U.S. PATENT DOCUMENTS

| | | | |
|---|---|---|---|
| 4,839,829 | 6/1989 | Freedman | 364/519 |
| 5,036,361 | 7/1991 | Filion et al. | 355/209 |
| 5,107,339 | 4/1992 | Bertoni et al. | 358/296 |
| 5,206,735 | 4/1993 | Gauronski et al. | 358/296 |
| 5,287,194 | 2/1994 | Lobiondo | 358/296 |
| 5,293,463 | 3/1994 | Masuda | 395/101 |
| 5,384,633 | 1/1995 | Boyd | 355/314 |

FOREIGN PATENT DOCUMENTS

| | | |
|---|---|---|
| 468762A3 | 1/1992 | European Pat. Off. . |
| WO94/11804 | 5/1994 | WIPO . |

*Primary Examiner*—Scott A. Rogers
*Attorney, Agent, or Firm*—Gary B. Cohen

[57] ABSTRACT

There is provided an apparatus for developing and displaying a representation of a total estimated time to print a job. The apparatus includes a user interface, with a display screen, for selectively programming the job with plural print related attributes, wherein selected ones of the print related attributes affecting a time required to print the job. The apparatus further includes a memory for storing the image data and the print related attributes as well as a processor for generating an estimated time to print value for each of the plural electronic pages based on the selected attributes programmed during said programming which affect the time required to print the job, the estimated time to print generating being performed prior to printing the job. In operation, the processor sums the values generated with the estimated time to print generating for obtaining a total estimated time to print, wherein the representation of the total estimated time to print is displayed on the display screen.

24 Claims, 7 Drawing Sheets

| | Ind. Job ETC | System ETC |
|---|---|---|
| Job 1 | 5:00 | 5:00 |
| Job 2 | 6:00 | 11:00 |
| Job 3 | 7:00 | 18:00 |

SYSTEM FOR DEVELOPING AND DISPLAYING A REPRESENTATION OF A TOTAL ESTIMATED TIME TO PRINT A JOB

The present invention relates generally to a technique for a printing system which stores a previously captured job and prints the same on demand and, more particularly, to an apparatus and method of developing and displaying a representation of a total estimated time to print the job.

In a conventional printing system a user provides an electronic master or "job", in the form of image data, to a print engine where prints are thereby marked by the print engine. In practice, a time period, the extent of which is typically unknown to the user, elapses. The inability to ascertain the extent of the time period can create a significant amount of inconvenience for the user. More particularly, in various systems a selected job is placed in a print queue pending printing of previously queued jobs. An example of a queue arrangement is disclosed in the following patent, the pertinent portions of which are incorporated herein by reference:

U.S. Pat. No. 5,206,735
Patentees: Gauronski et al.
Issued: Apr. 27, 1993

Due to the presence of the previously queued jobs, a significant time period can elapse prior to the printing of the selected job. In a network printing system provided by Xerox Corporation, a client user can determine, at a workstation, when printing of his/her job has been completed. While the job is in the queue, the user is informed that the job is in process. Accordingly, the user is not provided with an indication of when the job will start printing. It would be desirable to provide a system in which the user is provided with just such indication.

Long print runs can result in considerable inconvenience to a printing system user. Without any knowledge of print run time a user may send a job to a printer and visit the printer, shortly thereafter, to obtain one or more corresponding print sets. If the user has no idea as to the time interval required to print the job and the job is relatively complex, the user may be required wait a considerable time to obtain the printed job. With an indication regarding the amount of time required to print the job the user could have eliminated wasted waiting time spent at the printer.

Systems exist for indicating the extent to which a job has been printed. For example, the following patent is related to a method for displaying an estimated time remaining to print a job:

U.S. Pat. No. 5,036,361
Patentees: Filion et al.
Issued: Jul. 30, 1991

As disclosed in U.S. Pat. No. 5,036,361 an estimated time to complete a job can be displayed on the screen of a user interface. Moreover, a graphic representation is provided on a screen during the printing of a job to indicate the extent to which the job has been printed. The printing machine of the U.S. Pat. No. 5,036,361 is a "light-lens" copier in which captured image data is delivered directly to a print engine from the source of image capture. These sorts of copiers are unable to determine the amount of time required to perform post capture operations, such as image processing related operations. Moreover, these sorts of copiers do not employ compression/decompression techniques, so the time associated with such operations cannot be estimated therewith. While the approach of U.S. Pat. No. 5,036,361 is well suited for uncompressed jobs in which post capture operations are not required, there is no way such copier can accurately estimate time to job completion for a job requiring any more than scanning and marking. Indeed, it is believed that only printing machines capable of storing and evaluating a job, with its attendant attributes, can accurately access an estimate of corresponding print time for each type of job. It would be desirable to provide a technique in which a printing system user, prior to marking, is able to determine, with a relatively high degree of accuracy, an estimate of print time for a previously captured job.

In accordance with the present invention, there is provided an apparatus for developing and displaying a representation of a total estimated time to produce prints corresponding with a print job, the print job comprising plural electronic pages with image data and the apparatus including: a user interface, with a display screen, for selectively programming the job with plural print related attributes, wherein selected ones of the print related attributes affect a time required to print the job; a memory for storing the image data and the print related attributes; a processor for generating an estimated time to print value for each of the plural electronic pages based on the selected attributes programmed during said programming which affect the time required to print the job, said estimated time to print generating being performed prior to printing the job; and said processor summing the values generated with said estimated time to print generating for obtaining the total estimated time to print, wherein the representation of the total estimated time to print is displayed on said display screen.

These and other aspects of the invention will become apparent from the following description, the description being used to illustrate a preferred embodiment of the invention when read in conjunction with the accompanying drawings.

Figure 2:
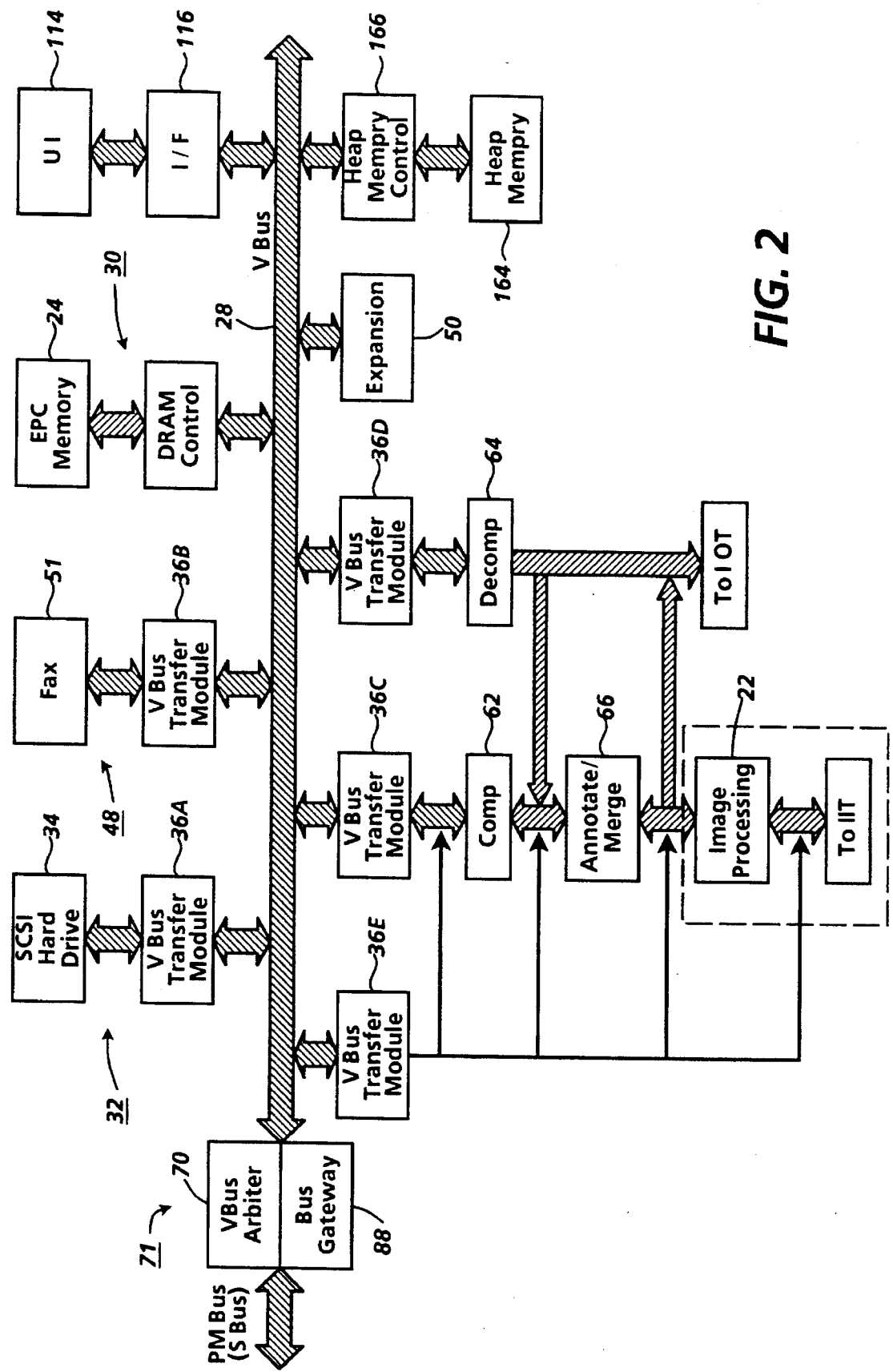
FIG. 2 is a block diagram of a video control module for the printing machine of FIG. 1.
Figure 7:
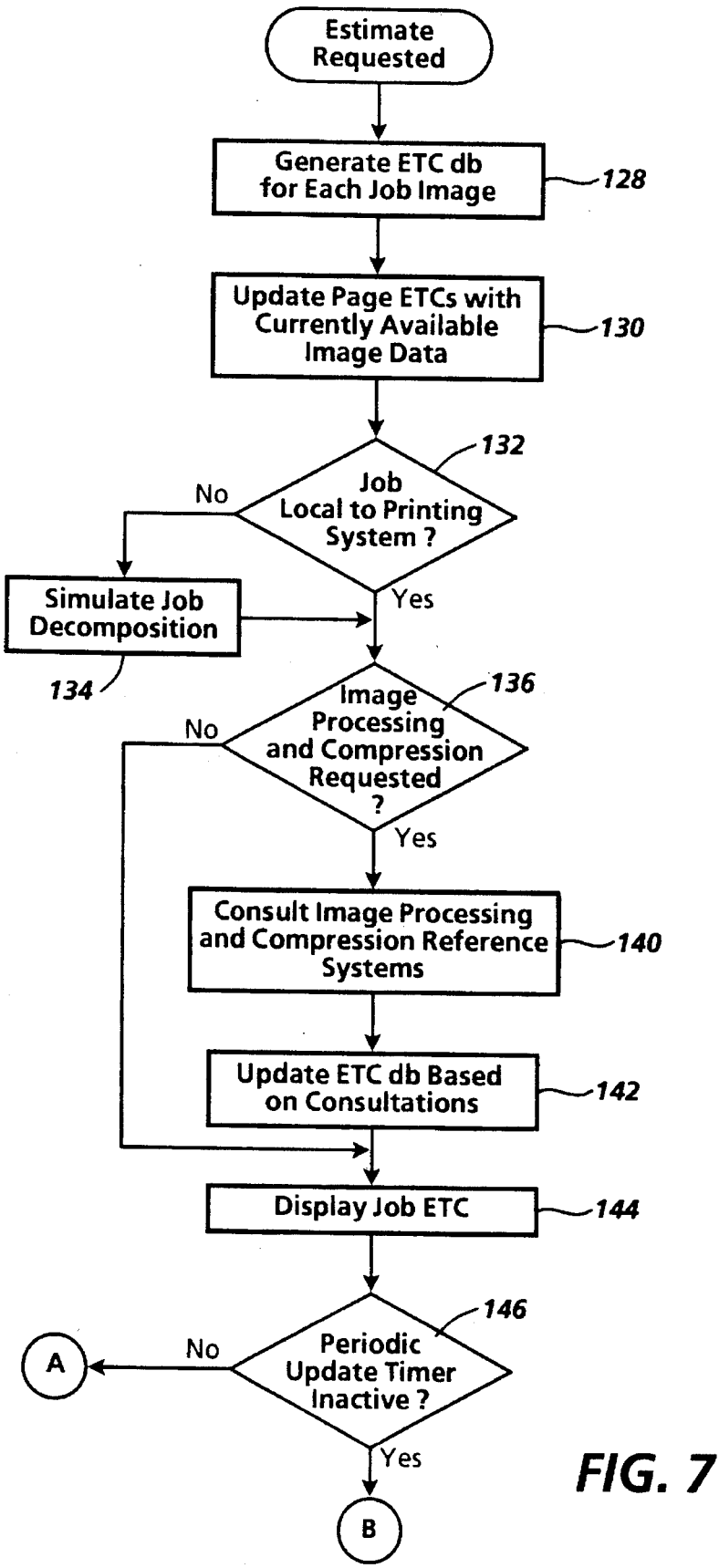
Figure 8:
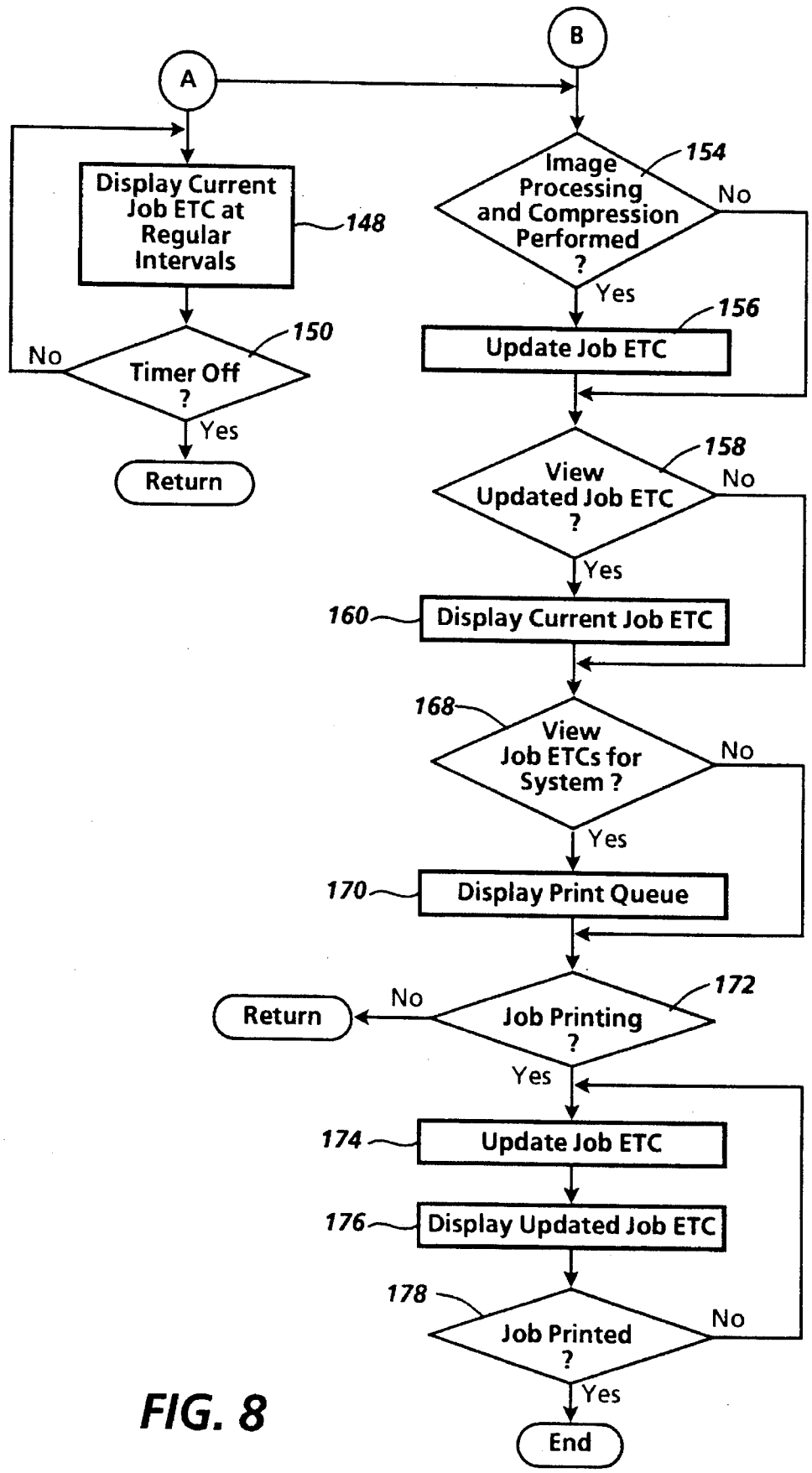
Figures 9, 10:
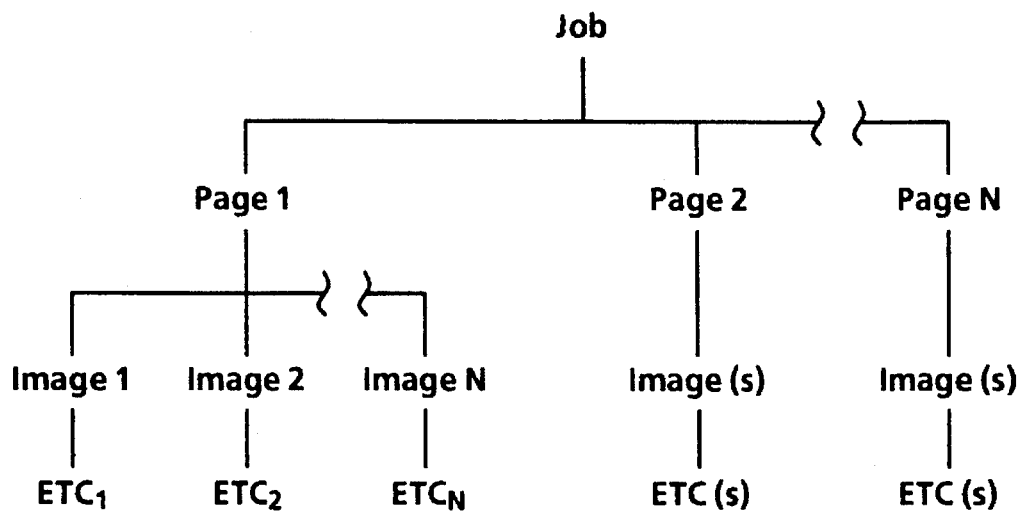

FIGS. 7 and 8 comprise a flow diagram representing a technique for estimating time to print for a job;

FIG. 9 represents a schematic diagram of a database use to maintain an ongoing record of an estimated time to completion for the job whose estimated time to print is estimated in the flow diagram of FIGS. 7 and 8; and FIG. 10 is an elevational view of a dialog intended for display on a user interface of the printing machine of FIG. 2.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
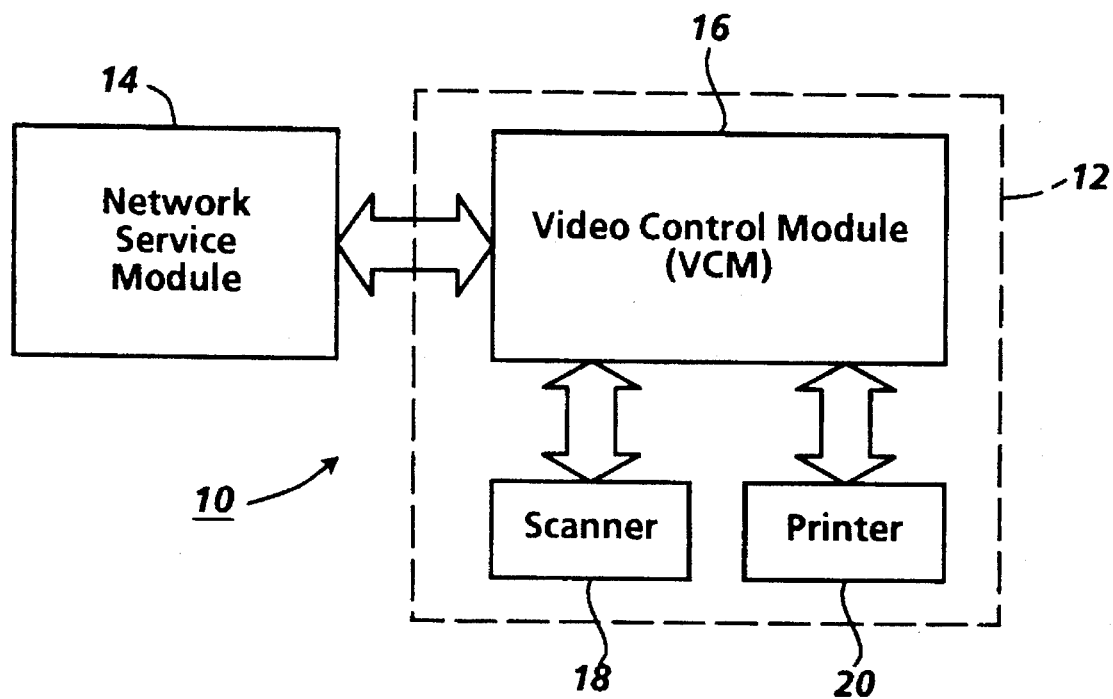
FIG. 1 is a block diagram depicting a multifunctional, network adaptive printing machine.

Referring to FIG. 1, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 2), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 1, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 2) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Referring specifically to FIG. 2, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g., a workstation) could be coupled to the VBus by way the transfer module 36a through use of a suitable interface and a SCSI line.

Figure 3:
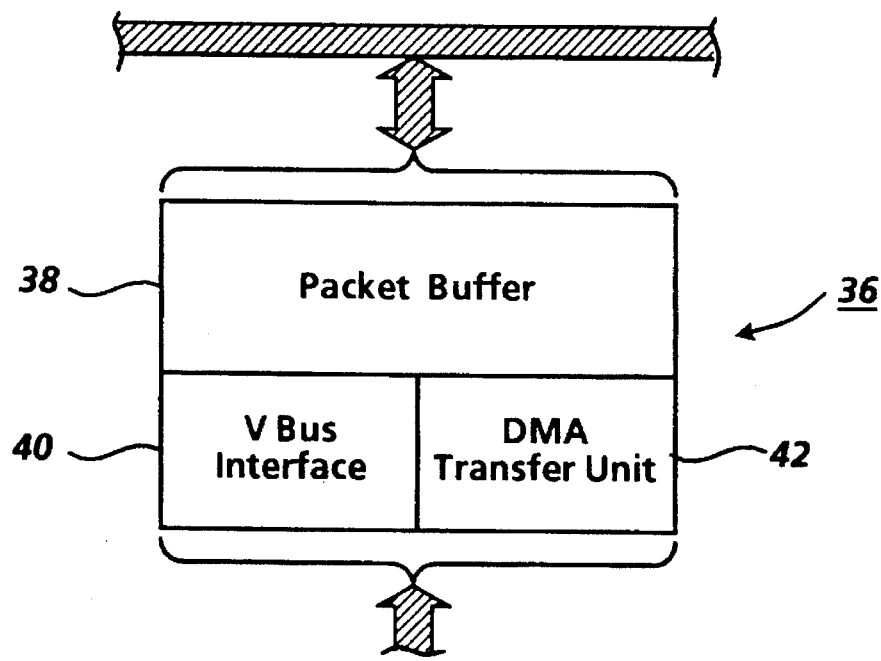
FIG. 3 is a block diagram of a transfer module used in conjunction with the printing machine of FIG. 2.

Referring to FIG. 3, the structure of one of the transfer modules 36 is discussed in further detail. The illustrated transfer module of FIG. 3 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can be programmed to handle packets of up to 64 Bytes. Preferably, the packet size would be reduced four times when the VBus is relatively busy and increased for times when activity on the bus is relatively low.

Figure 5:
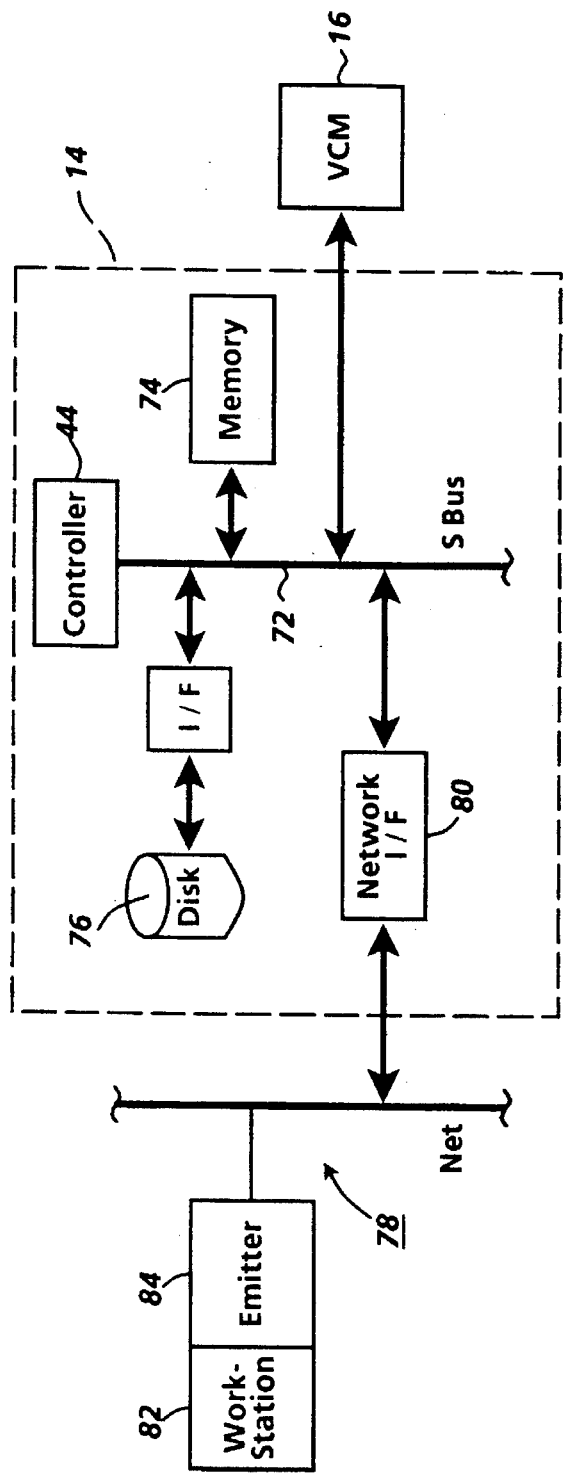
FIG. 5 is a block diagram of a network controller for the printing machine of FIG. 1.

Adjustment of the packet size is achieved with the VBus interface 40 and a system controller 44 (FIG. 5). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

More particularly, each image The DMA transfer unit employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 4:
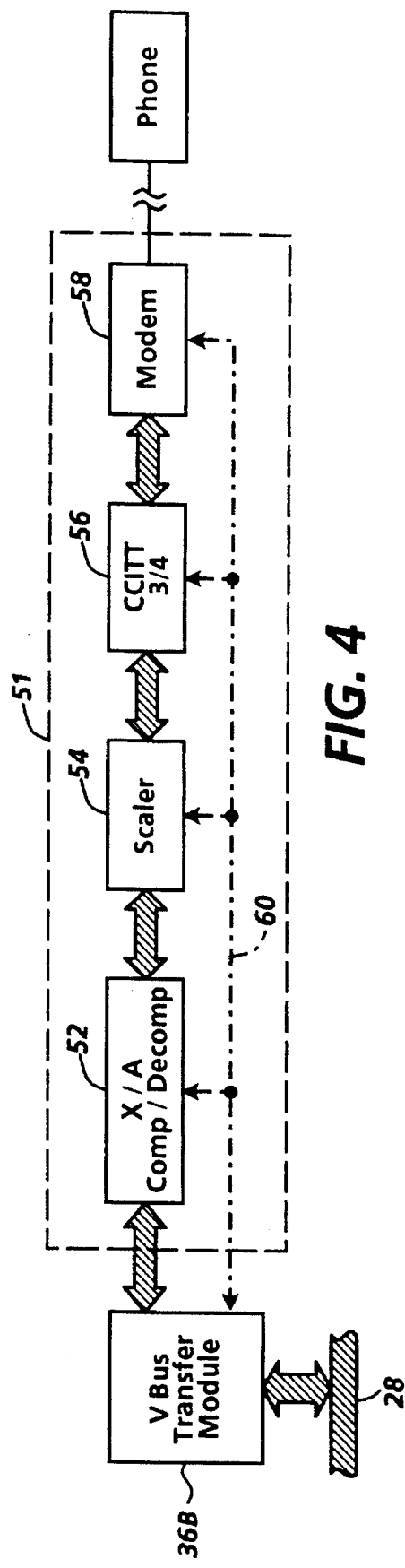
FIG. 4 is a block diagram of a facsimile card used in conjunction with the printing machine of FIG. 2.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 4, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 2, the IIT 18 and IOT 20 are operatively coupled to the VBus 28 by way of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 2, the scanner 18, which includes the image processing section 22, is coupled with an annotate/merge module 66. Preferably, the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The arbiter determines which bus master (e.g., FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 5, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 5, a storage or I/O device could be coupled with the SBus with a suitable interface chip. As further shown in FIG. 5, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. application Ser. No. 07/898,761 entitled "Apparatus and Method for Multi-Stage/Multi-Process Decomposing", filed on Jun. 12, 1992, by Bonk et al., and U.S. Pat. No. 5,226,112 to Mensing et al., the pertinent portions of both references being incorporated herein by reference. Further details regarding a technique for generating a job in a PDL may be obtained by reference to the following text, the pertinent portions of which are incorporated herein by reference:
PostScript® Language Reference Manual
Second Edition
Addison-Wesley Publishing Co.
1990

Referring again to FIG. 2, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 2, 3 and 5, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet tranfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Figure 6:
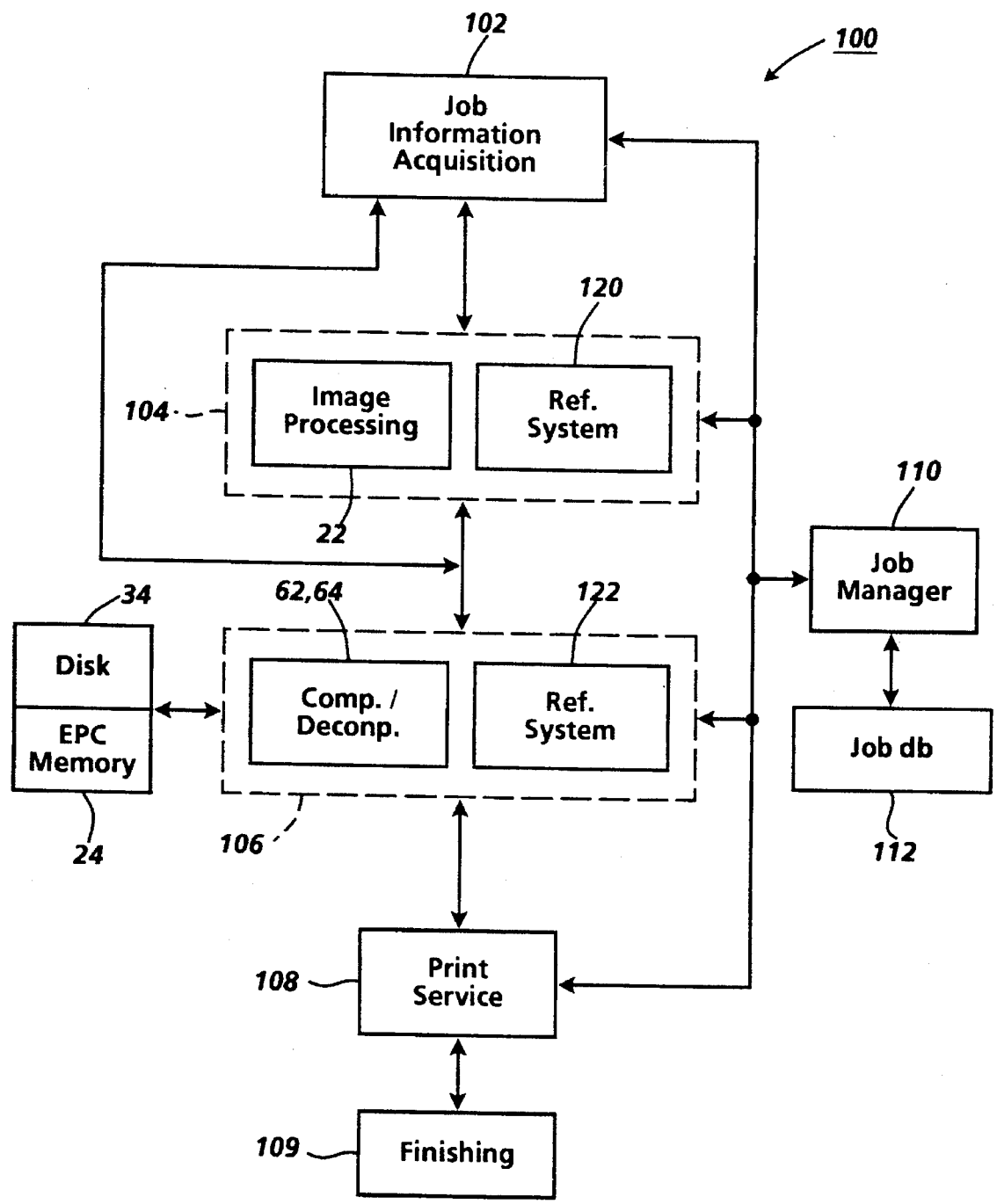
FIG. 6 is a block diagram representing a subsystem of the printing machine of FIG. 2.

Referring to FIG. 6, a model of a printing subsystem, including selected components of the printing system 10 of FIG. 2 is designated by the numeral 100. The printing subsystem 100, which is suitable for processing and printing a job comprising job attribute information and image data, includes a job acquisition section 102, an image processing service 104, a video service 106, a print service 108 and a finishing arrangement 109. Each of the subsystem components 102, 104, 106 and 108 communicates with a job manager or job process 110. The job manager 110 communicates with a job database ("db") 112. The job acquisition preferably includes a user interface ("UI") 114 (FIG. 2), for providing attributes of the job, and one of, among other sources, the scanner 18 (FIG. 1), the workstation 82 (FIG. 5), the Fax module 51 (FIG. 2) or other suitable input source, such as a floppy disk or CD-ROM (neither shown), for providing image data of the job.

Preferably, the attributes of the job, such as job level instructions (e.g., print quantity and finishing related instructions), page level instructions (e.g., plex and image processing related instructions) and stock characteristics are programmed with the UI 114 (FIG. 2), which UI is coupled with the VBus 28 by way of a suitable UI interface 116. Any suitable UI, such as the UI used with the DocuTech® printing system, would be appropriate for use as UI 114. With a UI, such as the one used by the DocuTech®, job attributes are set in a dialog or job ticket by way of keyboard input or a curser (e.g., "Mouse") technique. A job ticket suitable for use in the present embodiment is disclosed in U.S. Pat. No. 5,271,065 to Rourke et al., the pertinent portions of which are incorporated herein by reference.

The image processing service 104 includes the image processing section 22 (FIG. 2) and an image processing reference system 120. Preferably, the reference system includes one of plural tools necessary to estimate the time required to perform a given image processing operation, such as resolution conversion or image rotation, for a given image. In one example, the reference system 120 comprises a look up table mapping image size with one of plural image processing operations. In another example, an "intelligent" or heuristic algorithm, exploiting experiential data collected by the printing system for previously performed image processing operations is used to provide an estimate for each page to be image processed in the image processing section 22.

The video service 106 includes the compression service 62, the decompression service 64 and the reference system 122. As with the reference system 120, the reference system 122 can use, among other approaches, a look-up table, mapping uncompressed image data quantity against compressed quantity, or an intelligent algorithm in which the reference system determines the compressed size of a given page based on the degree to which the video service has compressed previous pages of comparable size.

The print service 108 includes one or more suitable print engines, each of which could include a distinct set of operating properties. As will appear, important operating properties, for purposes of obtaining estimated time to complete ("ETC") printing include, among others, time to image/mark one or both sides of a substrate and time to invert the substrate, when duplexing is demanded. As will be appreciated by those skilled in the art, print engine operating properties will vary in accordance with the type of print engine being employed, i.e., whether the print engine is among others, xerographic, ionographic or thermal ink jet.

Preferably information regarding each printer is provided to a printing system user by way of an icon displayed on a screen associated with the UI 114 of FIG. 2. This type of system, which permits the user to obtain "virtual printing", is discussed further in U.S. File Wrapper Continuation application Ser. No. 08/293,521 to Rosekrans et al., the pertinent portions of which are incorporated herein by reference. The concert of using icons to represent respective printers, with attendant printing properties is embodied in a Xerox® network printing system incorporating, among other components, a 6085 or SunSparc® workstation, View-point® software and a suitable network printer. Additionally, the print service includes a print manager for controlling the imaging process of the one or more suitable print engines. The concept of employing a print manager to supervise a printing process in a print engine is contemplated by the DocuTech® printing system.

The job manager 110 provides the "brain power" required to obtain a Job/Page ETC. The job manager comprises a process capable of calculating ETCs for each page. The methodology used by the job manager to obtain job ETCs will be discussed in further detail below. The job manager is also responsible for maintaining the database 112. As with the DocuTech printing system, images are stored in memory, such as the EPC memory 24/SCSI Disk 34 and corresponding image identifiers are stored in the database 112. Also, as with the DocuTech printing system, the image identifiers are used during printing to retrieve selected stored images. As further discussed below, the database 112 is employed to store page and job ETCs.

Preferably, certain operating parameters regarding the finishing arrangement 109 are made available at the job manager 110 for use in determining the Job ETC. In one example, the job manager is provided with the time required to finish (e.g., staple/bind) a representative print set. This time would include the number of skipped pitches required to be scheduled for each set. Further details regarding scheduling in a print engine with a finishing arrangement is disclosed in U.S. Pat. No. 5,095,342 to Farrell et al. and U.S. Pat. No. 5,184,185 to Rasmussen et al., the pertinent portions of both patents being incorporated herein by reference.

Referring to FIGS. 6–9, a technique for obtaining and displaying a time required to print a given job, i.e., for obtaining and displaying the Job ETC, is discussed. As soon as a nominal amount of information for a job is made available to the printing subsystem 100, an ETC database, as illustrated in FIG. 9, is, via step 128, constructed. As shown in FIG. 9, each page is mapped with one or more images and each image is associated with an ETC. Actually, the ETC database can even be constructed as soon as a nominal amount of job programming information is provided. More particularly, available information is communicated to the job manager 110 (FIG. 6) and the available data is processed, by the job manager, with the following criteria:

TR—time remaining estimate.
TOCS—time needed to print one collated set of the job.
QR—quantity (# of sets) remaining to be printed for the job. Initially, this value is the quantity programmed by the operator. After each set completes, QR is decremented by 1.
TBS—known time estimate for printing a banner sheet. A value of 0 is used if no banner sheet is required.
TF—time to apply the finishing on a set (or stack) of the job. Each finishing device has a known time estimate for its operation.
PJ—pages in the job.
TPPJ—time to process all the pages in the job.
TPP—time to process a specific page. Each page in a job can have a different TPP.
TPB—time to process the back side of a page.
IC—image complexity time factor (varies as a function of job compressablity).
IS—front (or back) image size time factor (accomodates for edge orientation).
OPS—time to pass a page of the output page size through a given print engine.
IPTP image processing time processing (inclues time for scaling, roatation, etc.).

PTP—time to perform desired print time processing for the image. Examples of print time processing are image shift, head-to-toe inversion, page numbering, etc.
DIT—time needed for duplex inverting page.
NS—number of stacks programmed by the operator.

$$TR=(TOCS*QR)+TBS$$

$$TOCS=TPPJ+TF$$

$$TPPJ=\text{Summation over all PJ of }(TPP)$$

$$TPP=TPF+TPB+OPS$$

$$TPF=IC+IS+PTP+IPTP$$

$$TBP=IC+IS+PTP+DIT+IPTP$$

$$TR=((\text{Summation over all remaining PJ of }(TPP))*NS)$$

$$TPP=TPF+TPB+OPS$$

$$TPF=IC+IS+PTP+IPTP$$

$$TPB=IC+IS+PTP+DIT+IPTP$$

As will appear, certain information necessary to perform the above-calculations will be unavailable prior to performing certain estimation related operations for the job, such as consulting the reference systems 120, 122. Accordingly, default values are provided initially for unavailable information.

At step 130, the database is updated in view of such information as selected printer and finisher operating properties as well as currently available image data. If the image data is from the network, the process proceeds from step 132 to step 134 where a decomposition simulation technique is performed. As is known, the decomposition process includes interpreting a page description language of a network job for obtaining a rasterized representation of the associated job images. In order to obtain an accurate estimate of print time for a network job it is desirable to simulate such rasterization. Since a rasterization of a relatively complex job can be time-consuming, it is proposed that each of page of a network job be introduced to a prepass simulator for sampling one or more representative portions of the page for decomposition. Upon simulating decomposition for the one or more sampled portions of a given page, an extrapolated page decomposition time, based on the time required to decompose such sample(s), would be generated.

Portions of either local or network jobs may require image processing and compression. In one example, portions of a scan job are to be image processed and all of the scan job is to be compressed for storage in memory. In another example, portions of a compressed network job are decompressed, image processed and recompressed. In either event, when image processing/compression services are requested (step 136), the reference systems 120, 122 are consulted (step 140) to ascertain estimated times for corresponding image processing and compression operations. It follows that times required for decompression can be determined on the basis of estimated compression times. In view of corresponding information obtained from the reference systems, the Page ETCs of the Job ETC database (FIG. 9) are updated (step 142) and, at step 144, a representative value is displayed at the UI 114.

The present estimating technique contemplates at least two approaches for displaying Job ETC. In one approach, certain defaults in the process cause the Job ETC to be displayed after selected events. For example, as indicated above, the Job ETC is displayed automatically after the ETC database is updated in view of consulting the image processing/video services. In some cases, however, a user may wish to have the current Job ETC displayed periodically. In this event, as indicated at step 146, an update timer can be activated so that a secondary loop causes the current Job ETC to be displayed periodically, via step 148, on the screen associated with the UI 114 (FIG. 2). As seen at step 150, the timer can be inactivated so that the only default displays (e.g. default display at step 144) are provided. It will be appreciated that the secondary loop does not affect operation of the main process in that the process proceeds to steps 148, 154 in parallel.

Assuming that an image processing or compression operation is performed (step 154), one or both of the reference systems 120, 122 is consulted and, in response to such consulting, the Job ETC is, via step 156, updated. In one example, selected pages of the job are to be image processed and compressed. For each one of the selected pages the appropriate look-up table or algorithm is referenced and the associated Page ETC is updated. After each Page ETC is updated, the Job ETC is updated and if viewing of the updated Job ETC is desired (step 158) a display of the current Job ETC is provided, via step 160, at a screen associated with the UI 114 (FIG. 2).

The printing system 10 is capable of storing multiple print jobs, by way of a print queue. More particularly, referring to FIGS. 2 and 10, information regarding each stored, print-ready job, is preferably stored in a heap memory 164, the heap memory comprising suitable nonvolatile memory coupled with the VBus 28 by way of a suitable heap memory control 166. Further details regarding queue systems suitable for use in a digital printing systems may be obtained by reference to U.S. Pat. No. 5,206,735. Referring specifically to FIG. 10, an exemplary queue maintained in heap memory is shown. In practice the queue, which includes at least two types of information, namely the Job ETC for each stored, print ready job and a cumulative time, i.e., a "System ETC", required to print the stored, print ready jobs, is displayed, via step 168, 170, on the screen associated with the UI 114. It will be appreciated that these times would be adjusted appropriately in accordance with job interrupts of the type discussed in U.S. Pat. No. 5,206,735.

Referring to step 172, if a job is not ready for printing, the system will continue multifunctional operation by way of a return step. As will be appreciated at one time or another, the process will return to step 172 in order to print the job whose printing time is estimated by the technique of FIGS. 7 and 8. At print time, a representation of the Job ETC is provided at the screen of the UI 114 and continuously updated, during printing, by way of steps 174, 176 and 178.

Numerous features, which follow from the above description will be appreciated by those skilled in the art:

First, a database, including information regarding an estimated time to complete each page of a job, is provided relatively early in a life cycle of the job, i.e., well before a first print for the job is produced. As further processing is performed on the job, e.g., image processing and/or data compression, the database is updated so that an estimated time to complete printing of the job is updated. In the preferred embodiment, information regarding time required to image process and/or compress the job can be obtained, for purposes of generating an estimated time to print the job, even before such operations are actually performed on the job.

Second, estimated time to print determinations can be performed on a variety of job types other than copy (scan)

jobs. For example, an estimated time to print determination can be obtained for a network job by simulating decomposition for a job. For those cases in which decomposition simulation is undesirable, due to time constraints, a sampling technique can be used to expedite the simulation process. In one example, selected samples of a job are decomposed and the decomposition time for the job is extrapolated from the time required to decompose the samples.

Third, the estimated time to print technique of the disclosed embodiment is well suited for use in a virtual printing arrangement. It is contemplated that the technique could be used in a printing system that accommodates a plurality of printers. Each of such printers would be characterized by a distinct set of operating properties, including, for example, print engine speed. By permitting a printing system user to estimate time to print for each of the available printers, the user is provided with a level of flexibility, in choosing printer destination, that would not normally be encountered.

Fourth, a job program can be edited advantageously in view of gaining an estimated time to print prior to printing the corresponding job. For example, a system user may call for certain types of job operations, such as certain types of image processing and finishing operations, the processing time of which the user may not be aware. This lack of knowledge on the part of the user can result in substantial inconvenience to the user in terms of both cost and time. By obtaining and estimated time to complete printing of the job, the user can ascertain if the estimated print time is acceptable and, if not, modify and/or delete those operations which would cause actual print time to be excessive.

Finally, the technique of the disclosed embodiment permits the user to obtain information about his/her job relative to other print jobs stored on the associated printing system. More particularly, in the preferred embodiment, the user is provided with a display showing each queued job with its corresponding estimated time to compile printing. Moreover, the cumulative times of the queued jobs are provided so that the user knows not only how long his/her job should take to print, but at what future moment his/her job will start printing.

What is claimed is:

1. In a printing system for producing prints from a job comprising plural electronic pages with image data, an apparatus for developing and displaying a representation of a total estimated time to print the job, comprising:

a user interface, with a display screen, for selectively programming the job with plural print related attributes, wherein selected ones of the print related attributes affect a time required to print the job;

a memory for storing the image data and the print related attributes;

a processor for generating an estimated time to print value for each of the plural electronic pages based on the selected attributes programmed during said programming which affect the time required to print the job, said estimated time to print generating being performed prior to printing the job; and said processor summing the values generated with said estimated time to print generating for obtaining the total estimated time to print, wherein the representation of the total estimated time to print is displayed on said display screen.

2. The apparatus of claim 1, in which one or more of the plural electronic pages are designated for image processing, further including an image processing estimation reference system, said image processing estimation reference system being consulted, with said processor, to determine an estimated time to print attributable to image processing.

3. The apparatus of claim 2, in which the image processing is performed on the one or more designated electronic pages, wherein the total estimated time to print representation is updated on the basis of said performing.

4. The apparatus of claim 1, in which the printing system includes a printing machine, with the print engine, and a client workstation, wherein:

said client workstation is connected to the printing machine by way of a network connection; and the image data is generated at the client workstation and transmitted, by way of the network connection, to the printing machine.

5. The apparatus of claim 4, in which the job is written in a page description language, wherein said estimated time to print generating includes estimating a time period required to decompose the job.

6. The apparatus of claim 5, wherein:

the time period estimation is obtained by simulating decomposition of selected portions of the job;

each of the selected portions is associated with one of the plural electronic pages; and each of the selected portions is smaller in size than the electronic page with which it is associated.

7. The apparatus of claim 1, in which the printing system includes a first print engine with a first set of operating properties and a second print engine with a second set of properties, the estimated time to print value varies as a function of print engine operating properties, and the first set of print engine operating properties is different than the second set of print engine operating properties, wherein:

a first total estimated time to print the job is generated with the first set of operating properties and a second total estimated time to print the job is generated with the second set of operating properties; and one of the first and second print engines is selected for printing the job by reference to the first total estimated time to print the job and the second estimated time to print the job.

8. The apparatus of claim 1, in which the selective programming of the job is represented on the display screen, wherein:

the selective job programming is changed in response to the displayed total estimated time to print; and said estimated time to print generating, said summing and said displaying are performed for the changed selective job programming.

9. The apparatus of claim 1, in which one or more of the plural electronic pages are designated to be compressed or decompressed, further including a compression/decompression estimation reference system, said compression/decompression estimation reference system being consulted, with said processor, to determine an estimated time to print attributable to compression or decompression.

10. A method for developing and displaying a representation of a total estimated time to print a job in a printing system, the printing system having a memory, a display screen and a print engine, the job comprising plural electronic pages with image data, comprising:

selectively programming the job with plural print related attributes, wherein selected ones of the print related attributes affect a time required to print the job;

storing the image data and the print related attributes in the memory;

prior to printing the job, generating an estimated time to print value for each of the plural electronic pages based on the selected attributes programmed during said programming which affect the time required to print the job; and summing the values generated in said estimated time to print generating for obtaining the total estimated time to print; and displaying the representation of the total estimated time to print on the display screen.

11. The method of claim 10, further comprising designating image processing to be performed on one or more of the plural electronic pages wherein said generating includes consulting, for the one or more designated plural electronic pages, an image processing estimation reference system to determine an estimated time to print attributable to image processing.

12. The method of claim 10 further comprising performing the image processing on image data of the one or more of the plural electronic pages and, based on said performing, updating the total estimated time to print representation.

13. The method of claim 12, further comprising displaying the updated total estimated time to print representation.

14. The method of claim 10, in which the printing system includes a printing machine and a client workstation with the client workstation being connected to the printing machine by way of a network connection, further comprising the steps of generating the image data at the client workstation and transmitting the generated image data, by way of the network connection to the printing machine.

15. The method of claim 14, in which the job is written in a page description language, wherein said estimated time generating includes estimating a time period required to decompose the job.

16. The method of claim 15, wherein said time period estimation includes obtaining the time period by simulating decomposition of selected portions of the job.

17. The method of claim 10, in which the printing system includes a first print engine with a first set of operating properties and a second print engine with a second set of properties, the estimated time to print value varies as a function of print engine operating properties, and the first set of print engine operating properties is different than the second set of print engine operating properties, wherein said method includes performing said estimated time generating, said summing and said displaying for each of the first set of print engine operating properties and the second set of print engine operating properties, and further comprising selecting one of the first and second print engines for printing the job on the basis of performing said estimated time to print generating, said summing and said displaying for each of the first set of print engine operating properties and the second set of print engine operating properties.

18. The method of claim 10, in which the selective programming of the job is represented on the display screen, further comprising:

changing the selective job programming in response to the displayed total estimated time to print; and performing said estimated time to print generating, said summing and said displaying for the changed selective job programming.

19. The method of claim 10, in which the selective job programming includes an attribute corresponding with a finishing operation to be performed on the job, wherein said changing step includes a selected one of changing the finishing operation associated with the attribute and cancelling the finishing operation associated with the attribute.

20. The method of claim 10, further comprising designating a compression or decompression operation to be performed on one or more of the plural electronic pages wherein said estimated time to print generating includes consulting, for the one or more designated plural electronic pages, a compression/decompression estimation reference system to determine an estimated time to print attributable to compression or decompression.

21. The method of claim 20, further comprising displaying the updated total estimated time to print representation.

22. The method of claim 10, in which the job is associated with a customer and the customer is charged a rate based on print time, further comprising estimating a job charge based on the total estimated time to print.

23. A method for developing and displaying a first representation of a total estimated time to print a first job in a first printing system and a second job in a second printing printing system, each of the first and second printing systems having a memory, a display screen and a print engine, each of the first and second jobs comprising plural electronic pages with image data, comprising:

a) selectively programming one of the first and second jobs with plural print related attributes, including selected ones of the print related attributes affecting a time required to print the one of the first and second jobs;

b) storing both the image data and the print related attributes for the one of the and second jobs in the memory;

c) prior to printing the one of the first and second jobs, generating an estimated time to print value for each of the plural electronic pages of the one of the first and second jobs based on the selected attributes programmed with said programming which affect the time required to print the one of the first and second jobs; and d) summing the values generated in said step c) for obtaining the total estimated time to print the one of the first and second jobs;

e) repeating a)–d) for the other one of the first and second jobs; and f) displaying the first representation of the total estimated time to print the first job and the second representation of the total estimated time to print the second job on the display screen.

24. The method of claim 23, further comprising:

a) summing the total estimated time to print the first job and the total estimated time to print the second job to obtain a representation of the total estimated time to print both the first and second jobs; and b) displaying the representation of the total estimated time to print both the first and second jobs on the display screen.

* * * * *